July 23, 1929.    I. E. TORRENCE    1,721,536
SEMAPHORE
Filed June 2, 1928
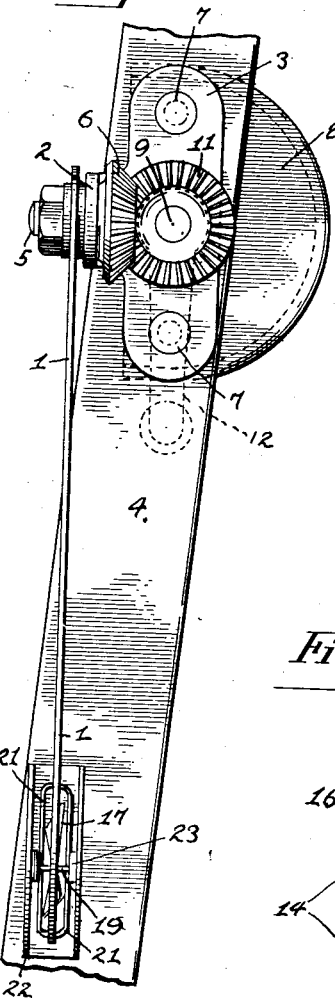
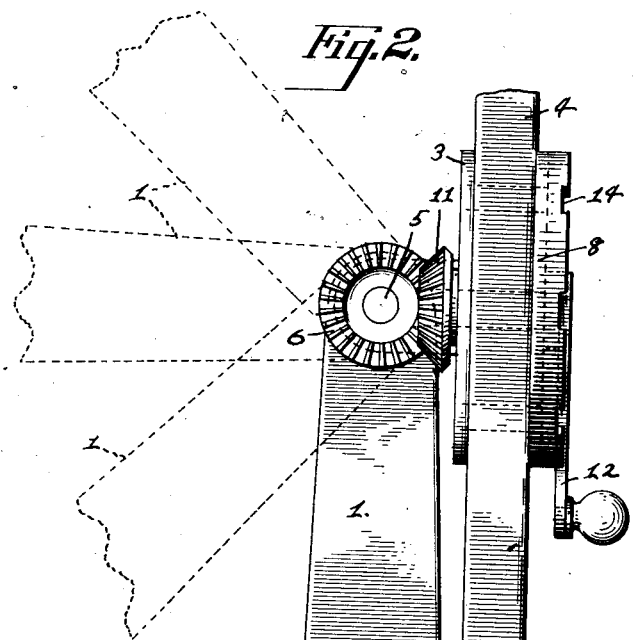
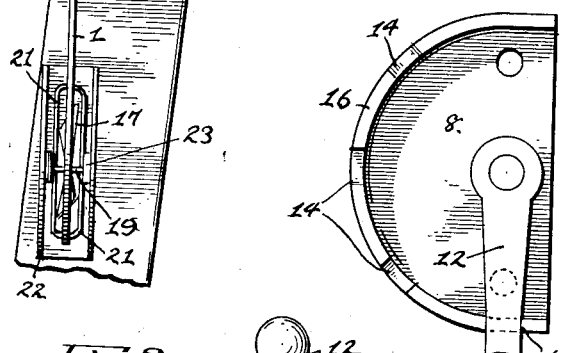
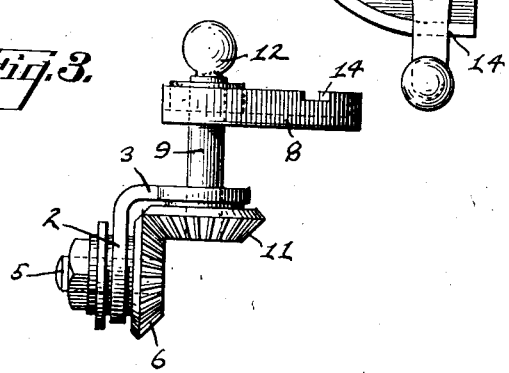
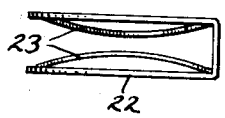
INVENTOR.
IRA E. TORRENCE.
By Arthur L. Slee
ATTY.

Patented July 23, 1929.

1,721,536

UNITED STATES PATENT OFFICE.

IRA E. TORRENCE, OF SAN FRANCISCO, CALIFORNIA.

SEMAPHORE.

Application filed June 2, 1928. Serial No. 282,454.

My invention relates to improvements in signaling semaphores for motor vehicles and the like wherein a semaphore arm is geared to an actuating member and arranged to be moved thereby from an inoperative position to any of a plurality of outwardly extended operative positions, said arm being arranged to be held in any of said positions and being provided with a rotatable member arranged to be driven by the movement of the member through the air and to be concealed when the arm is in inoperative position.

The primary object of my invention is to provide an improved semaphore for motor vehicles and the like.

Another object is to provide an improved signaling device provided with means for attracting attention and rendering the signal conspicuous when in operative position.

A further object is to provide an improved semaphore which may be easily installed and which will be positive and efficient in operation.

Another object is to provide an improved semaphore having a rotatable element arranged to be rotated to attract attention when the arm is extended into operative position and to be concealed and rotation prevented when in inoperative position.

A further object is to provide an improved device of the character described wherein a signal arm and an actuating lever are journaled upon a single bracket and geared directly together whereby said arm may be moved and held in any of a plurality of positions.

A still further object is to provide an improved structure which is light and at the same time rugged and durable, and which may be easily mounted upon vehicles and supports of various types.

I accomplish these and other objects by means of the improved device disclosed in the drawings forming a part of the present application wherein like characters of reference are used to designate similar parts throughout the specification and drawings, and in which—

Fig. 1 is a side elevation of my improved semaphore as applied upon the side of a windshield bracket;

Fig. 2 is a view of the device from the rear;

Fig. 3 is a plan view of the device;

Fig. 4 is a side elevation of the actuating lever and retaining segment; and

Fig. 5 is a plan view of the shield for engaging the free end of the semaphore arm when in inoperative position.

Referring to the drawings, the numeral 1 is used to designate in general a semaphore arm pivotally mounted upon an outwardly extending bearing portion 2 of a bracket 3 arranged to be secured upon the side of a windshield supporting bracket 4 or other suitable supporting member adjacent the driver's seat of a motor vehicle. The arm 1 is secured upon a pivot pin 5 journaled in the bearing portion 2 and provided with a bevel gear 6.

The bracket 3 is secured in convenient position upon the support 4 by means of suitable securing members 7 extending through the bracket and support and also through a retaining segment 8 held against the opposite side of the support 4. An actuating shaft 9 extends through the segment 8, support 4, and a bearing formed in the bracket 3, said shaft 9 being arranged at right angles to the pivot pin 5 and provided with a bevel gear 11 meshing with the gear 6. An actuating lever 12 is secured upon the inner end of the shaft 9, said lever being made from suitable spring material and so arranged that it will normally spring into engagement with any of a plurality of retaining notches 14 formed in a flange 16 provided upon the segment 8.

A member 17 provided with inclined vanes is rotatably mounted within an opening 18 formed in the outer or free end of the arm 1. The member is arranged substantially within the plane of the arm 1 and is rotatably supported by means of a shaft 19 having its ends supported by means of a wire frame 21 extending across the opening 18 upon opposite sides of the arm.

A shield 22 is mounted upon the support 4 to receive the outer end of the arm 1 when moved to an inoperative position. The shield 22 consists of a sheet metal strip having side portions bent to substantially parallel relation and provided with inwardly struck bar portions 23. The shield is of a size adapted to substantially enclose the rotatable member 17 when the end of the arm 1 is moved between the parallel side portions of the shield, and the bar portions 23 exert a resilient pressure against opposite sides of the wire frame 21 whereby the end of the arm is held against rattling within the guide.

In operation, the semaphore is mounted upon the support 4 substantially as shown so that the arm 1 and the lever 12 will normally hang substantially in inoperative position, the lower or free end of the arm 1 being received between the side portions of the shield 22. When it is desired to move the signal arm to a signaling position, the lever 12 is sprung outwardly to disengage the notch at the bottom of the segment 8 and swung upwardly to move the signal to the desired position, said lever being then allowed to spring into engagement with the proper retaining notch 14. The bevel gears 6 and 11 are preferably made of the same size so that the arm 1 and lever 12 will be moved through the same degree of movement, and the notches 14 are arranged at intervals of 45° so that the arm may be retained in any of a plurality of signaling positions as indicated in dotted lines in Fig. 2.

While the arm is in normal position, the rotating member 17 is enclosed within the shield member 22, thereby causing said member to be concealed. When the arm 1 is moved to a signaling position, the movement of the member 17 through the air causes the member to be rotated in the manner of a wind mill, thereby serving to attract attention and rendering the signal more conspicuous. When the signal is returned to inoperative position, the shield 22 protects the rotatable member and shields the same from air currents, thereby rendering the rotatable member inoperative until the arm is again moved to a signaling position.

The moving parts of the device are assembled and effectively supported upon the single bearing bracket 3 so that proper alinement is maintained, and a simple and efficient structure and operation obtained. The parts are all of simple construction and there are no light or delicate parts which may become out of order, thus permitting the device to be made relatively light and at the same time obtaining a rugged and durable construction. The specific details of construction are subject to modification in numerous ways, and I desire to avail myself of all such modifications as may fall within the scope of the appended claims.

Having thus described my invention what I claim as new and desire to secure by Letters Patent is—

1. A semaphore for motor vehicles comprising a bracket arranged to be secured upon the side of a vehicle and provided with bearing portions arranged at substantially right angles; an arm pivotally mounted in connection with one of the bearing portions; a lever pivotally mounted in connection with the other bearing portions; bevel gears mounted in meshing relation in connection with the arm and lever; a notched segment plate mounted adjacent the lever, said notches being arranged to receive the lever and hold said lever and arm in inoperative position or in any of a plurality of extended operative positions; a rotatable member mounted within the free end of the arm and arranged to be rotated by movement through the air to attract attention when the arm is extended to an operative position; and a member arranged to resiliently engage the free end of the arm and conceal the rotatable member when the arm is in inoperative position.

2. The combination with a semaphore arm for motor vehicles, of a rotatable member mounted within the arm and arranged to be rotated by movement through the air for attracting attention to the semaphore when in a signaling position; and a member having spaced parallel side portions provided with inwardly bowed portions arranged to resiliently engage the arm and to conceal and prevent rotation of the rotatable member when the semaphore arm is in an inoperative position.

In witness whereof, I hereunto set my signature.

IRA E. TORRENCE.